United States Patent
Kalopissis et al.

[15] 3,674,902
[45] July 4, 1972

[54] HAIR COSMETIC COMPOSITIONS CONTAINING NON-IONIC SURFACE ACTIVE AGENTS

[72] Inventors: Gregoire Kalopissis, Paris; Guy Vanlerberghe, Mitry-Mory (Seine et Marne), both of France

[73] Assignee: Societe anonyme dite: L'Oreal, Paris, France

[22] Filed: Sept. 27, 1968

[21] Appl. No.: 763,340

Related U.S. Application Data

[62] Continuation-in-part of Ser. No. 541,527, April 11, 1966, abandoned.

[30] Foreign Application Priority Data

April 15, 1965 Luxembourg............................48,400
March 28, 1966 Luxembourg............................50,777

[52] U.S. Cl..........................................424/70, 8/10.2, 8/11, 8/93, 252/DIG. 1, 252/DIG. 13, 252/81, 252/152, 260/404, 260/615 B, 260/615 R, 424/DIG. 1, 424/47, 424/78, 424/365
[51] Int. Cl..........................................A61k 7/06, A61k 7/12
[58] Field of Search..........................8/10, 11, 10.2, 10.1, 93; 252/308, 89, 152, DIG. 1, DIG. 13; 260/615, 615 B, 404

[56] References Cited

UNITED STATES PATENTS 2,965,678  12/1960  Sundberg et al. ........................8/93 X
3,081,354  3/1963   Gaertner et al. ........................8/93 X
3,427,248  2/1969   Lamberti et al. ....................260/615 X Primary Examiner—Albert T. Meyers
Assistant Examiner—Vera C. Clarke
Attorney—Holcombe, Wetherill & Brisebois

[57] ABSTRACT

Cosmetic compositions, such as shampoos and hair dyes, which contain non-ionic surface active agents that form cleaning compositions that do not irritate the mucous membrane of the eyes having the formula

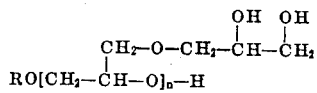

in which R is selected from the group consisting of alkyl, alkenyl and alkyl and alkenyls having intervening CONH, O and CHOH groups having eight to 22 carbon atoms, and n is 1 to 5 and methods of making said compound.

7 Claims, No Drawings

HAIR COSMETIC COMPOSITIONS CONTAINING NON-IONIC SURFACE ACTIVE AGENTS

This application is a continuation-in-part of application Ser. No. 541,527 which was filed on Apr. 11, 1966, now abandoned.

This invention relates to improved cosmetic compositions, especially hair cosmetic compositions, which contain non-ionic surface active agents which do not irritate the skin or the mucous membrane of the eyes and aid in dispersing the cosmetic ingredients into aqueous and alcoholic solutions. Shampoos and hair dye compositions which contain the new surface active agents of this invention improve the luster, softness and the manageability of the hair.

There are many known non-ionic surface-active agents, the properties and composition of which vary considerably. However, none of the known products obtained from the raw materials currently in use afford simultaneously all the characteristics desired for certain specific applications.

Thus among those monoethers of polyethylene glycol in which the lipophile chain comprises at least eight carbon atoms, the best detergents and foaming agents are generally the most irritating to the mucous membrane. Moreover, when they are associated with cationic surface active agents a particularly objectionable synergistic tendency to irritate these membranes results.

On the other hand, the derivatives of the polyols and of sugars, especially their esters, have been given much attention because they are non-irritating. They are, however, difficult to prepare. In particular, the non-selective character of the reactions used in their preparation results in the formation of a mixture of constituents having one or more lipophile chains per molecule. When these products are to be used under conditions requiring solubility in water, they must be laboriously purified.

The hydrosolubility of these compounds may be improved by introducing hydrophile substituents on the hydrocarbon chain or by adding ethylene oxide to the free hydroxyl groups. However, in general, such compounds are not good foaming agents even when they have a hydrocarbon chain of normal length. Consequently they are used mainly as emulsifiers.

The object of the present invention is to provide non-ionic surface active compositions which are simultaneously stable, very hydrophilic, non-irritating, non-toxic, and usable as wetting agents, foaming agents, detergents or emulsifiers.

More specifically the object of the present invention is to provide cosmetic compositions which contain the new non-ionic surface active agents responding to the following formula:

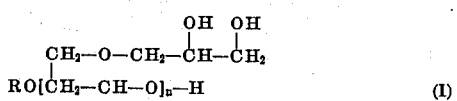
(I)

in which R represents an alkyl or alkenyl hydrocarbon chain, which may be linear or branched, which has eight to 22 carbon atoms and alkyl and alkenyl groups having one or more intervening —CONH—, —O— and —CH·OH— groups which have eight to 22 carbon atoms which may be a dihydroxyalkyl an acylaminoalkyl, an acylaminoalkyloxyalkyl, alkyloxyalkyloxyalkyl, and in which $n$ is a number equal to 1 to 5, essentially characterized by the fact that $n$ molecules of allyl-glycidyl-ether are polycondensed onto an alcohol having the formula ROH, in which R has the same significance as above, and that the resulting product is then hydroxylated by means of an organic peracid.

During the polycondensation reaction which constitutes the first step of the process of preparation according to the invention, a mixture of compounds, all of which respond to the general formula

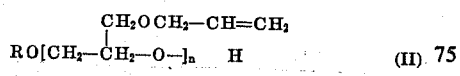
(II)

are formed, in which the number of fixed molecules of allyl-glycidyl-ether may be greater or less than the statistical average value corresponding to the number of molecules of allyl-glycidyl-ether introduced per molecule of alcohol. It follows that the process of preparation according to the invention makes it possible to obtain a mixture of compounds having hydrophilic chains the length of which is dependent on the value of $n$ in Formula I, the group of values of $n$ being statistically distributed about an average value corresponding to the number of molecules of allyl-glycidyl-ether provided per molecule of alcohol.

But the point which should be emphasized, and which leads to one of the essential advantages of the process of preparation according to the invention, is that the process results in the formulation of compounds having a single lipophile chain for each hydrophile chain, so that the hydrophilic property of the mixture is greatly accentuated.

Moreover, it should be noted that the method of preparation according to the invention makes it possible to regulate at will the hydrophilic and lipophilic properties of the end product. In effect, the hydrophilic property of the compounds may be regulated by selecting the value of the number n of molecules of allyl-glycidyl-ether which are reacted with each molecule of alcohol. The lipophilic property may be regulated by selecting the length of the hydrocarbon chain in the alcohol used as the starting material.

In the method of manufacture according to the invention, the polycondensation of the allyl-glycidyl-ether may be carried out in the presence of an acid catalyst or Lewis acid catalyst such as boron fluoride, stannic fluoride or antimony pentachloride, or in the presence of a basic catalyst such as triethylamine. This reaction is carried out at a temperature between 25° and 100° C and preferably between 40° and 60° C. The hydroxylation step is preferably carried out with an organic peracid such as peracetic acid and performic acid formed in situ from hydrogen peroxide and an organic acid such as acetic or formic acid. This reaction is effectuated at between 20° and 80° C and preferably between 30° and 50° C.

The compounds according to formula I which are thus obtained are good detergents, foaming agents, or emulsifiers. This property, together with their hydrophilic property, makes it advantageous to use them in the cosmetic field, particularly as shampoos for the hair. It should moreover be emphasized that these compounds, in a 5 percent aqueous solution, are non-irritating and are perfectly tolerated by the mucous membrane of the eye. This property has been clearly established by tests on the eyes of a group of rabbits, using the methods described by J.H. Draize, G, Woodward and H.O. Calvery in the "Journal of Pharmacology," 1944, Vol. 82, pages 377–389, and by J.H. Draize and E.A. Kelly in "Proceeding of Scientific Section." 17, 1–4 (1952). No lesion of any nature resulted on the ocular mucous membranes of the rabbits after said tests.

The present invention is also directed to compositions which may be used for cosmetic purposes, and particularly as shampoos or emulsifiers, and compositions being characterized by the fact that they contain at least one composition containing a compound of Formula I and have a pH range of 3 to 9.

The cosmetic compositions according to the invention are preferably aqueous solutions containing about 1 to 25 percent of compounds according to Formula I. Conventional additives ordinarily used in cosmetics, such as thickening agents and other ionic or non-ionic surface active agents, may be added to these solutions. Hair washed with such solutions presents a lustrous appearance, and is soft and non-electric. The compounds according to Formula I may also be used in cosmetic preparations as carriers for hair dyes.

Shampoo compositions containing the surface active agents of this invention may be in liquid, paste, cream, gel or aerosol form. The shampoo compositions may contain conventional perfumes, such as rose water, violet water, etc.; coupling agents for use with perfume oils or hair conditioners to help maintain clear solutions, such as ethyl alcohol, diethylene glycol, pine oil, propylene glycol, etc.; clarifying agents, such as tetrasodium and tetrapotassium pyrophosphates; viscosity modifiers, such as methyl cellulose, polyvinylalcohol, gum arabic, etc.; and conditions, such as lanolin, lecithin, mineral oil, diglycol stearate, etc.

Hair dye compositions which contain the surface active agents of this invention may be in liquid, paste, cream or gel form. The dye compositions may contain the conventional perfumes, coupling agents, hair conditions and thickening agents mentioned above. Any suitable hair dye may be used with these compositions, such as oxidation dyes such as p-phenylenediamine, 2,4-diaminoanisole, p-toluylenediamine, p-aminophenylglycine, 2-amino-4-nitrophenol; azo dyes, anthraquinone dyes, etc. These dye compositions may also contain antioxidant compounds, such as sodium sulphite, dye stabilizers, such as resorcinol, pyrogallol, etc., and a developer such as hydrogen peroxide, etc.

The following compounds illustrate the compounds used in the compositions of this invention:

(1) $C_{10}H_{21}O\ [C_2H_3O(CH_2OCH_2CHOH\text{—}CH_2OH)]_1\ H$
(2) $C_{12}H_{25}O\ [C_2H_3O(CH_2OCH_2CHOH\text{—}CH_2OH)]_2\ H$
(3) $C_{14}H_{29}O\ [C_2H_3O(CH_2OCH_2CHOH\text{—}CH_2OH)]_3\ H$
(4) $C_{18}H_{37}O\ [C_2H_3O\ (CH_2OCH_2\ CHOH\ CH_2OH)\ ]_4\ H$ (5)

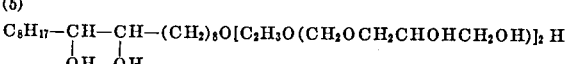
$C_8H_{17}\text{—}CH\text{—}CH\text{—}(CH_2)_8O[C_2H_3O(CH_2OCH_2CHOHCH_2OH)]_2\ H$
         |         |
         OH     OH (6) $C_{11}H_{23}\ CONH\ CH_2CH_2O\ CH_2CH_2\ \text{—}\ O\ \text{—}\ [C_2H_3O\ (CH_2OCH_2CHOHCH_2OH)]_2\ H$ (7) $C_{11}H_{23}CONHCH_2CH_2\text{—}O\ [C_2H_3O(CH_2OCH_2CHOHCH_2OH)]_2\ H$ (8)

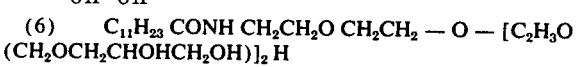
$C_{11}H_{23}CONH\text{—}CH_2CH\text{—}O\text{—}[C_2H_3O(CH_2OCH_2CHOHCH_2OH)]_2H$
                      |
                     CH_3

(9) $CH_3\text{—}(CH_2)_7\ CH\ \ CH\text{—}(CH_2)_7\ CONHCH_2CH_2\ O\ [C_2H_3O(CH_2OCH_2CHOHCH_2OH)]_3\ H$

(10) $C_{18}H_{37}OCH_2CH_2\text{—}O\ [C_2H_3\ O\ (CH_2\ OCH_2CHOH\ CH_2\ OH)]_3\ H$

(11) $C_{12}H_{25}\ OCH_2\ CH_2\ OCH_2\ CH_2O\ [C_2H_3O(CH_2\ O\ CH_2\ CHOH\ CH_2\ OH)]_2\ H$ (12)

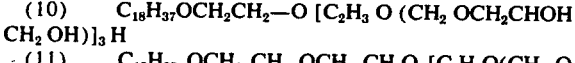
$C_8H_{17}CONH\text{—}CH_2CHO[C_2H_3O(CH_2OCH_2CHOH\text{—}CH_2OH)]_3H$
                     |
                    CH_3

(13) $C_{16}H_{33}O\ [C_2H_3O\ (CH_2OCH_2\ CHOH\ CH_2OH)]_3\ H$
(14) $C_8H_{17}\ O\ [C_2H_3O\ (CH_2O\ CH_2\ CHOH\ CH_2\ OH)]_1\ H$

(15)
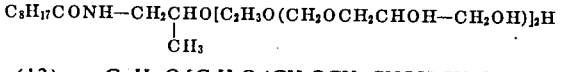
$C_{10}H_{21}$
       \
        CH—CH_2O[C_2H_3O(CH_2OCH_2CHOHCH_2OH)]_3\ H
       /
$C_8H_{17}$

(16)
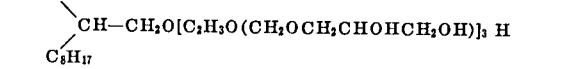
$C_8H_{13}$
       \
        CH—CH_2O[C_2H_3O(CH_2OCH_2CHOHCH_2OH)]_2\ H
       /
$C_8H_{17}$

(17)
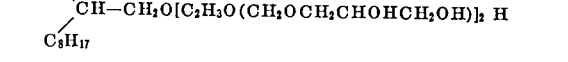
$\qquad\qquad\qquad\qquad CHOCH_2CHOH\text{—}CH_2OH$
$\qquad\qquad\qquad\qquad\ \ |$
$R\text{—}CONHCH_2CH_2O\text{—}[CH_2\text{—}CHO]_3\ H$

(18)
$\qquad\qquad\qquad\qquad CHOCH_2COH\text{—}CH_2OH$
$\qquad\qquad\qquad\qquad\ \ |$
$R\text{—}CONH\text{—}CH_2\text{—}CH_2\text{—}CH_2O[CH_2\text{—}CHO]_2\ H$ (where R is a fatty acid derived from copra) and the corresponding intermediate alkenyl compounds of Formula II of the specific dihydroxy compounds of Formula II listed above.

In order that the invention may be more clearly understood, several specific examples will now be described, purely by way of illustration, showing the preparation and use of products of this invention.

EXAMPLE 1

Preparation of the compound:
$C_{12}H_{25}O\ [C_2H_3O(CH_2OCH_2CHOH\text{—}CH_2OH)]_n\ H$ (in which n has a statistical average value of 2).

74.5 g of anhydrous lauryl alcohol is introduced into a flask provided with mechanical agitating means, followed by 0.3 ml of an acetic compound of boron fluoride containing 36 percent $BF_3$. A nitrogen atmosphere is maintained with the flask. The temperature of the mixture is increased to 50° C and 91.2 g of allyl-glycidyl-ether is added drop by drop, slowly enough to keep the temperature between 45° and 60° C.

After the addition of the allyl-glycidyl-ether has been completed, the reaction mixture is permitted to return to the ambient temperature. The product obtained is a colorless liquid which is insoluble in water. Measurement of the epoxide function makes it possible to check that all the allyl-glycidyl-ether involved has reacted.

74.5 g of the product obtained in this manner is dissolved in 80 g of 98 percent formic acid and 31 g of 35 percent hydrogen peroxide is added while vigorously agitating the mixture. The temperature rises from 25 to 40° C, and is kept there for 2 hours, after which it is left at the ambient temperature for 12 hours. The temperature is then increased to 40° C and 10 g of 35 percent hydrogen peroxide is added in two separate steps. After 10 hours of reaction, the remaining peroxide is destroyed by adding 4 g of sodium sulfite and the formic acid is evacuated under reduced pressure while progressively raising the temperature to 120° C.

The product is again dissolved in 200 ml of absolute ethyl alcohol, to which 1 g of sodium methylate is added to act as catalyst for the alcoholysis. The mixture is left at room temperature for 24 hours, filtered, and the ethyl formate evaporated.

The resulting polyhydroxylated composition is a very thick colorless syrup, which dissolves readily in water to produce a solution which foams copiously.

EXAMPLE 2

Preparation of the compound:
$C_{14}H_{29}O\ [C_2H_3O\ (CH_2OCH_2CHOCH_2OH)]_n\ H$
(in which n has a statistical average value of 2.5).

The procedure is essentially the same as in Example 1.

114 g of allyl-glycidyl-ether is reacted at between 50° and 60° C with 88 g of tetradecylic alcohol, in the presence of 0.35 ml of an acetic compound of boron fluoride containing 36 percent $BF_3$ to yield a colorless liquid. 101 g of this product is dissolved in 108 g of 98 percent formic acid and hydroxylized with 66 g of 35 percent hydrogen peroxide, as set forth in Example 1.

After reacting for 14 hours at 40° C and 7 hours at 35° C the remaining peroxides are destroyed by adding 5 g of sodium sulfite. The formic acid is then evaporated and the product remaining is dissolved in 280 ml of absolute alcohol, and filtered. 10 g of a 26 percent solution of sodium methylate in methanol is then added. The mixture is left at the ambient temperature for 24 hours, after which the ethyl formate and alcohol are evaporated off, yielding a translucent pasty product which is soluble in water.

EXAMPLE 3

Preparation of the compound:
$C_{18}H_{37}O\ [C_2H_3O\ (CH_2OCH_2CHOHCH_2OH)]_n\ H$
(in which n has a statistical average value of 3.5).

The process followed is essentially the same as that described in Example 1.

0.45 ml of an acetic compound of boron fluoride containing 36 percent $BF_3$ is added to 115 g of melted stearyl alcohol. 160 g of allyl-glycidyl-ether is then added drop by drop, while stirring and maintaining the temperature between 50° and 60° C. 103 g of the condensation product obtained is dissolved in 110 g of 98 percent formic acid, 71 g of 35 percent hydrogen peroxide is then added and after 21 hours of reaction at 40° C the process yields a polyhydroxylated compound which is partially esterified with formic acid. After alcoholysis with absolute ethanol in the manner described in Example 1, the end product is a solid compound soluble in water at 50° C.

EXAMPLE 4

Preparation of the compound:

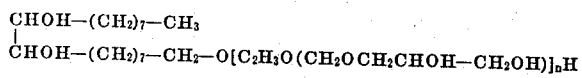

(in which n has the statistical average value of 2).

67.5 g of oleic alcohol plus 0.30 ml of an acetic compound of boron fluoride containing 36 percent $BF_3$ are introduced into a flask provided with a mechanical agitator. The temperature of the mixture is then raised to 45° C and 57 g of allyl-glycidyl-ether is added drop by drop slowly enough to keep the temperature between 45° and 50° C.

When the addition of the allyl-glycidyl-ether has been completed, the reaction mixture is then permitted to return to the ambient temperature. The resulting product is a colorless liquid which is insoluble in water. Measurement of the epoxide function makes it possible to check that all the allyl-glycidyl-ether has reacted.

99.6 g of the product thus obtained is dissolved in 125 g of 98 percent formic acid and 71 ml of hydrogen peroxide at 128 volumes is added drop by drop while stirring vigorously. The mixture is kept at 40°–50° C for 30 hours, and then forms a product which is soluble in water at 35° C.

EXAMPLE 5

Preparation of the compound:

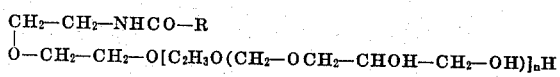

in which R indicates an alkyl radical derived from the fatty acids of copra and n is a number having a statistical average value of 1.

First step: Preparation of N-acyl-diglycolamine

A mixture of fatty acids derived from copra is condensed with diglycolamine in stoichiometric quantities, yielding an amide having the formula:

in which R has the significance indicated at the beginning of the example.

This amide is purified in the following manner: 100 g of the melted product is washed first with a hot aqueous solution containing 10 percent sodium chloride and 1 percent hydrochloric acid, and then twice with an aqueous 10 percent solution of sodium chloride. After decanting, the product is dissolved in 350 ml of benzene, and the water-benzene azeotrope, as well as the excess benzene are distilled off. The resulting purified N-acyl-diglycolamine contains 1.7 percent of free fatty acids.

Second step: Polycondensation

Preparation of the compound having the formula:

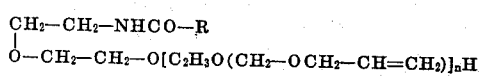

3.5 g of triethylamine (0.15 mol) and then 17 g of allyl-glycidyl-ether are added to 45 g of purified and melted N-acyl-diglycolamine (0.15 mol). The mixture is heated at 60° C for 7 hours. Measurement of the epoxide function makes it possible to check that, at the end of this time, all the allyl-glycidyl-ether introduced has reacted.

The resulting product is then heated under vacuum on a boiling water bath for half an hour, after which it is washed three times with 50 ml of boiling water and then with 20 ml of a concentrated solution of sodium chloride, and finally dehydrated by heating to 100° C under vacuum.

Third step: Hydroxylation 45 g of the product obtained in the second step is dissolved in 67.5 g of 98 percent formic acid. 15 ml of hydrogen peroxide at 126 volumes is added little by little to the solution. The reaction lasts 16 hours and the temperature remains between 40° and 45° C.

After destruction of the peroxides, evaporation of the formic acid, and ethanolysis, a waxy product is recovered which is soluble in water and responds to the formula given at the beginning of this Example.

EXAMPLE 6

An aqueous solution having the following composition is prepared:

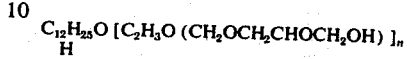

(in which n has a statistical average value of 2)

| | |
|---|---|
| Cetyl-trimethyl ammonium bromide | 10 g |
| Lactic acid q.s.p. | 3 g |
| Water, q.s.p. | pH 5 |
| | 100 g |

The hair is moistened and 10 cm³ of the above composition is applied thereto. The head is then massaged energetically and rinsed copiously with water, after which another 8 to 10 cm³ of the product is applied. The hair is again rinsed and dried, after which it is lustrous, soft, and non-electric.

EXAMPLE 7

An aqueous solution having the following composition is prepared:

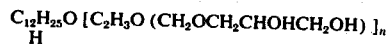

(in which n has a statistical average value of 2)

| | |
|---|---|
| Diethanolamide of copra | 10 g |
| Polyethylene glycol (Molecular weight 5,000) | 1 g |
| Water, q.s.p. | 0.1 g |
| | 100 g |

The resulting solution has a pH of 7.5.

When used as a shampoo, the hair is first moistened, and 10 cm³ of the above solution is applied while massaging vigorously. The hair is then copiously rinsed with water, and 8 to 10 cm³ more of the product is applied. The hair is again rinsed and dried, after which it appears lustrous and is soft and non-electric.

EXAMPLE 8

An emulsion having the following composition is prepared:

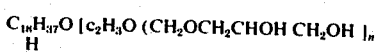

(in which n has a statistical average value of 3.5)

| | |
|---|---|
| Stearyl alcohol | 8 g |
| Paraffin oil | 4 g |
| Glycerin | 28 g |
| Water | 6 g |
| | 54 g |

The emulsion obtained with this product is agreeable to use, penetrates the skin rapidly, and imparts thereto a velvety appearance.

EXAMPLE 9

A hair dye having the following composition is prepared:

| | |
|---|---|
| The compound of Example 4 | 8 g |
| Sodium sulphite | 0.3 g |
| p-phenylenediamine | 0.5 g |
| o-aminophenol | 0.1 g |
| p-aminodiphenylamine | .05 g |
| p-aminophenol | 0.1 g |
| 4-nitro-1,2-diaminobenzene | 0.2 g |
| 2,4-diaminoanisol | 0.025 g |
| resorcinol | 0.5 g |
| $NH_4OH$ to pH 9.5 | |
| water | 100 cc |

The dye was mixed with an equal amount of 6 percent hydrogen peroxide solution and applied to the hair for 40 minutes. The hair color produced is dark ash blonde.

It will be appreciated that the foregoing examples have been given purely by way of illustration and may be modified as to detail without thereby departing from the basic principles of the invention. In particular the hydrophilic properties of the compounds according to the invention may be increased by subsequent reaction with one or more molecules of ethylene oxide. Similarly, the compounds according to the invention may be transformed into ionic surface active agents by introducing an ionic group such as sulfate, carboxylate, or phosphate, for example.

What is claimed is;

1. An aqueous cosmetic composition for the hair comprising water and 1–25 weight percent of a non-toxic surface active agent having the formula

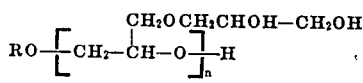

wherein R is selected from the group consisting of alkyl having eight–22 carbon atoms, alkenyl having eight–22 carbon atoms, alkyl having a total of eight–22 carbon atoms and carrying two hydroxy substituents, acylaminoalkyl having a total of eight–22 carbon atoms and wherein the acyl moiety is derived from an alkyl and alkenyl monocarboxylic acid having eight–18 carbon atoms, acylaminoalkyloxyalkyl having a total of eight–22 carbon atoms and wherein the acyl moiety is derived from an alkyl and alkenyl monocarboxylic acid having eight–18 carbon atoms, alkyloxyalkyloxyalkyl having a total of eight–22 carbon atoms and alkyloxyalkyl having a total of eight–22 carbon atoms, and $n$ is 1–5.

2. The composition of claim 1 wherein R is alkyl having eight–22 carbon atoms.

3. The composition of claim 1 wherein R is alkenyl having eight–22 carbon atoms.

4. The composition of claim 1 wherein said agent has the formula

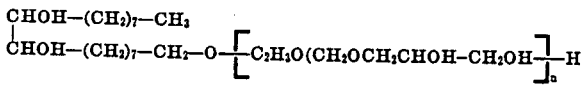

5. The composition of claim 1 having a pH of 3–9 for use as a shampoo.

6. The composition of claim 1 having a pH of 3–9 for use as a hair dye composition and also including an oxidation hair dye in amounts sufficient to color hair.

7. The composition of claim 6 wherein said oxidation hair dye is selected from the group consisting of p-phenylenediamine, 2,4-diaminoanisole, p-toluylenediamine, p-aminophenylglycine, 2-amino-4-nitrophenol, o-aminophenol, p-aminodiphenylamine, p-aminophenol and 4-nitro 1,2-diaminobenzene.

* * * * *